2 Sheets--Sheet 1.
C. T. EDWARDS & G. H. HUNTOON.
Wind-Wheel.
No. 161,938. Patented April 13, 1875.
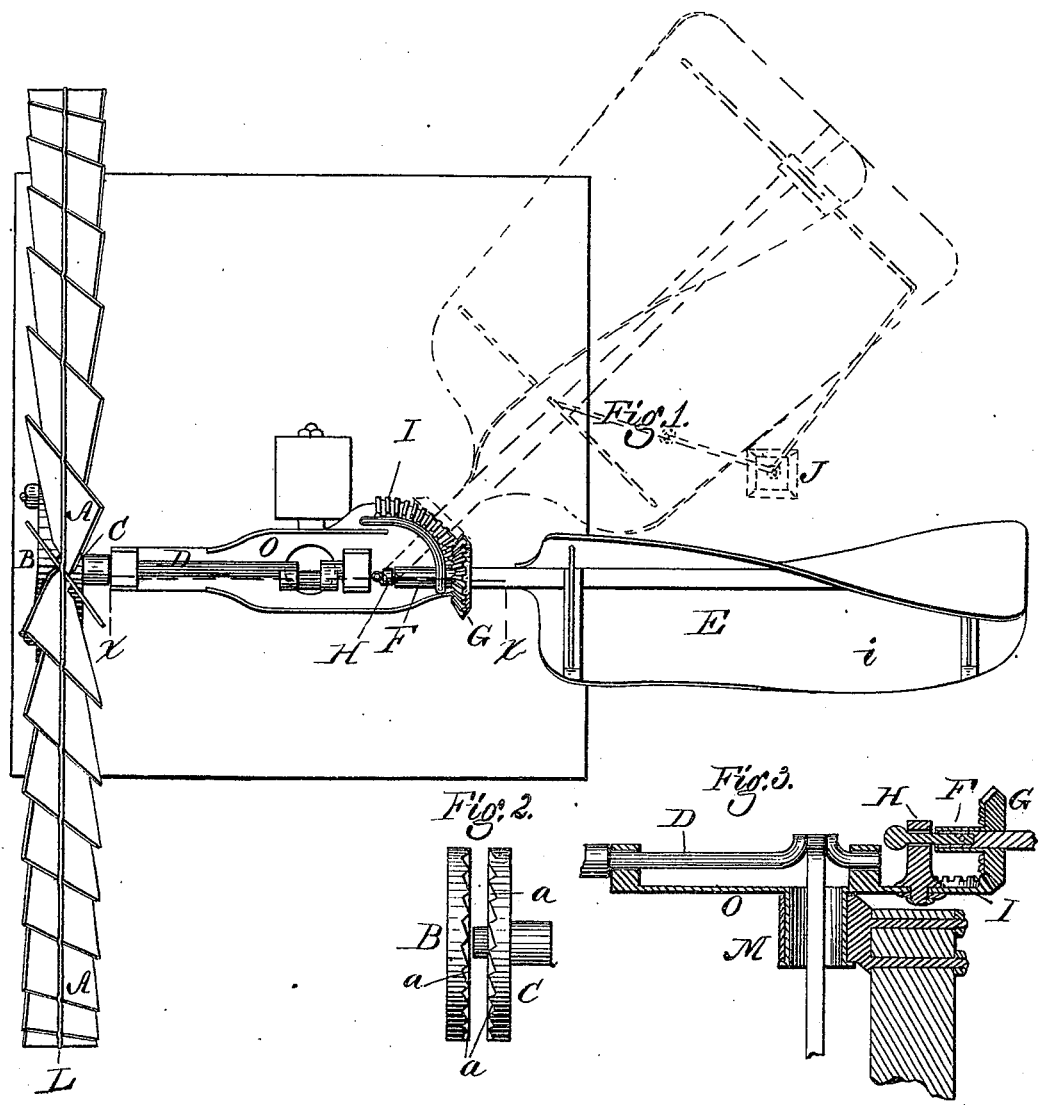
Witnesses:
Will W. Dodge
S. T. Clifton
Inventors:
Charles T. Edwards
George H. Huntoon
By Dodge & Son
Attys.
THE GRAPHIC CO. PHOTO-LITH. 39 & 41 PARK PLACE, N.Y.

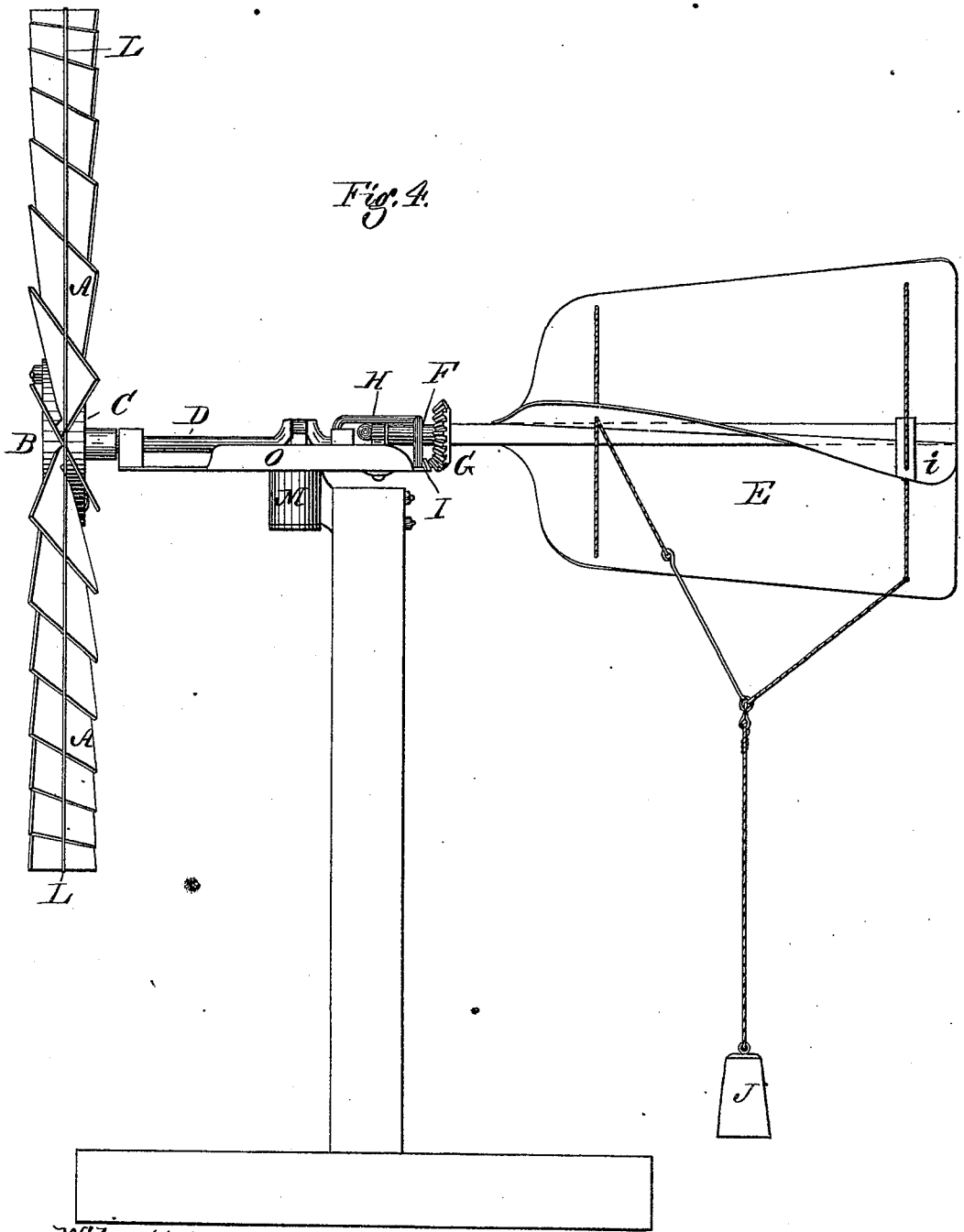

UNITED STATES PATENT OFFICE.

CHARLES T. EDWARDS AND GEORGE H. HUNTOON, OF MOLINE, ILLINOIS; SAID HUNTOON ASSIGNOR TO SAID EDWARDS.

IMPROVEMENT IN WIND-WHEELS.

Specification forming part of Letters Patent No. 161,938, dated April 13, 1875; application filed February 25, 1875.

*To all whom it may concern:*

Be it known that we, CHARLES T. EDWARDS and GEORGE H. HUNTOON, of Moline, in the county of Rock Island and State of Illinois, have invented certain Improvements in Wind-Wheels, of which the following is a specification:

Our invention consists in providing the wheel with a spiral vane, so arranged that it will be rotated by a strong wind, and caused to swing laterally, so as to turn the wheel obliquely to the wind, and in certain minor details of construction, as hereinafter fully explained.

Figure 1 represents a top-plan view of our wheel; Fig. 2, an edge view of the two disks or plates between which the inner ends of the blades are secured; Fig. 3, a longitudinal vertical section on the line $x\,x$, and Fig. 4 a side elevation of the wheel.

In constructing the wheel proper, we provide a suitable number of thin tapering wooden blades, A, and two circular metal disks or plates, B and C, each having radial grooves or notches $a$ in one side or face, and then, placing the plates with their grooved faces opposite each other, as shown in Fig. 2, insert the inner ends of the blades between them, after which we draw the two plates firmly together by passing bolts through them, or in any other suitable manner.

In order to give additional strength and stiffness to the wheel, one of the disks or plates may be provided with a central hub, fitting into or through the other one, and when this is done the disks may be drawn and held together by a nut screwed upon the end of the central hub, outside of the plate through which the hub passes, thus permitting the bolts or other fastenings to be dispensed with. The wheel may be strengthened by securing a band, L, around the outer ends of the blades, as shown. This band will prevent the blades from springing out of position, warping, or working out endwise, as they might otherwise do.

Our wheel, constructed as above, we mount on the end of a horizontal shaft, D, which is supported on a rotating frame or turn-table, O, which latter is provided with a tail-vane, E, to keep the wheel faced to the wind, the peculiar form and arrangement of this vane constituting the second part of our invention.

As shown in Fig. 1, the vane is twisted or made of a spiral form from end to end, and is supported at its inner end by a horizontal shaft, F, which is passed through a bevel-pinion, G, and mounted loosely in a vertical rotating post, H, mounted on the frame or turn-table O, as shown in Figs. 1 and 4. The pinion G is secured firmly to the shaft, and gears into a pinion, I, which is secured to the frame or turn-table, concentric with the post H, as shown. As the wind increases in force it causes the spiral vane to rotate about its longitudinal axis, and thereby turn the shaft F and pinion G, the consequence of which is that the pinion G travels around the pinion I, and thereby swings the vane horizontally to one side, as shown in dotted lines in Fig. 1, so that the vane causes the wheel to swing around in a position oblique to the wind. It will be seen that the vane has a double or compound motion, consisting of a motion around its longitudinal or horizontal axis, and another horizontally around the vertical post H. In order to bring the vane back again to its normal position, we suspend from its lower edge a weight, J, as shown in Fig. 4, the weight tending to resist the movement of the vane, and to bring it back to its natural position after it has been moved therefrom. In the drawing, we have shown the vane with a rib or spline, $i$, one side, as shown in Figs. 1 and 4, as we find the same of service, when given a spiral form, in aiding the rotary motion of the vane. It is obvious, that instead of mounting the vane in the manner shown, and employing the pinions, it may be arranged or connected in any other suitable manner, in order to have it swing sidewise as it is rotated. It is also obvious that instead of twisting the vane its entire length, it may be simply twisted at one end, or that, instead of being twisted, its upper and lower edges may be set in oblique positions, so that it will be rotated by the force of the wind. The frame O is made with a hollow journal, which is mounted in a bracket, M, cast with arms, which extend through the supporting-post and receive nuts. It is obvious that the wheel used may be of any suitable construction, provided it turns upon a horizontal axis; but the wheel shown is considered the best form.

Having thus described our invention, what we claim is—

1. In combination with a rotating frame, O, having a wind-wheel mounted on its forward end, a spiral vane, E, arranged substantially as shown, so that the force of the wind will cause it to rotate about its longitudinal axis, and at the same time swing laterally.

2. In combination with the frame O, provided with the post H and pinion I, the spiral vane, provided with the pinion G and the weight J, as shown.

CHARLES T. EDWARDS.
GEORGE H. HUNTOON.

Witnesses:
R. A. LINEHAN,
W. J. WELLS.